(12) United States Patent
Masias

(10) Patent No.: US 11,137,781 B2
(45) Date of Patent: Oct. 5, 2021

(54) ADJUSTABLE DEADBAND CONTROL SYSTEM

(71) Applicant: EMERSON PROCESS MANAGEMENT REGULATOR TECHNOLOGIES, INC., McKinney, TX (US)

(72) Inventor: Justin L. Masias, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 120 days.

(21) Appl. No.: 16/180,241

(22) Filed: Nov. 5, 2018

(65) Prior Publication Data

US 2019/0072194 A1    Mar. 7, 2019

Related U.S. Application Data

(60) Continuation of application No. 15/673,053, filed on Aug. 9, 2017, now Pat. No. 10,678,274, which is a
(Continued)

(51) Int. Cl.
*G05D 16/16* (2006.01)
*F16K 17/10* (2006.01)
(Continued)

(52) U.S. Cl.
CPC ........... *G05D 16/163* (2013.01); *F16K 17/10* (2013.01); *G05D 16/024* (2019.01); *G05D 16/16* (2013.01);
(Continued)

(58) Field of Classification Search
CPC ...... F16K 17/10; G05D 16/024; G05D 16/16; G05D 16/163; G05D 16/166;
(Continued)

(56) References Cited

U.S. PATENT DOCUMENTS

| 285,163 A | * | 9/1883 | Ross | ................. F16K 17/10 |
| | | | | 137/488 |
| 843,174 A | * | 2/1907 | Reynolds | ............. G05D 16/163 |
| | | | | 137/489 |

(Continued)

OTHER PUBLICATIONS http://www.epta.com.ar, Pneumatic Relays product series, Aug. 2015.
(Continued)

*Primary Examiner* — Robert K Arundale
*Assistant Examiner* — Richard K. Durden
(74) *Attorney, Agent, or Firm* — Marshall, Gerstein & Borun LLP

(57) ABSTRACT

A control system having a pressure regulator, first pilot, and second pilot. The pressure regulator has a fluid inlet, fluid outlet, and actuator assembly with a cavity divided into a first chamber in fluid communication with the fluid outlet and a second chamber. The first pilot has a first setpoint and the second pilot has a second setpoint, less than the first setpoint. The first and second pilots fluidly couple the second chamber to the fluid outlet and isolate the second chamber from the fluid inlet in a first mode of operation, isolate the second chamber from the fluid outlet and fluid inlet in a second mode of operation, and fluidly couple the second chamber to the fluid inlet in a third mode of operation.

14 Claims, 9 Drawing Sheets

Related U.S. Application Data division of application No. 14/825,454, filed on Aug. 13, 2015, now Pat. No. 9,760,097.

(60) Provisional application No. 62/170,453, filed on Jun. 3, 2015.

(51) Int. Cl.
| | |
|---|---|
| *G05D 16/00* | (2006.01) |
| *F16K 1/52* | (2006.01) |
| *F16K 31/126* | (2006.01) |
| *F16K 17/02* | (2006.01) |

(52) U.S. Cl.
CPC .............. *F16K 1/523* (2013.01); *F16K 1/526* (2013.01); *F16K 17/02* (2013.01); *F16K 31/126* (2013.01); *Y10T 137/7795* (2015.04); *Y10T 137/7796* (2015.04)

(58) Field of Classification Search
CPC ........... Y10T 137/7762; Y10T 137/777; Y10T 137/7795; Y10T 137/7796
See application file for complete search history.

(56) References Cited

U.S. PATENT DOCUMENTS

| | | | | |
|---|---|---|---|---|
| 871,260 | A * | 11/1907 | Dyer | G05D 16/163 137/489.5 |
| 985,175 | A * | 2/1911 | Hirst | G05D 16/163 137/489.5 |
| 1,110,320 | A | 9/1914 | Fulton | |
| 1,189,349 | A | 7/1916 | Cross | |
| 1,767,702 | A * | 6/1930 | Ruckstuhl | G05D 16/18 137/488 |
| 1,995,949 | A * | 3/1935 | Spence | G05D 16/163 137/492.5 |
| 2,543,846 | A | 3/1951 | Griswold | |
| 2,690,760 | A * | 10/1954 | Hughes | G05D 16/163 137/484.2 |
| 2,707,970 | A * | 5/1955 | Hughes | G05D 16/163 137/489 |
| 2,731,032 | A * | 1/1956 | Hughes | G05D 16/0655 137/492 |
| 3,977,423 | A | 8/1976 | Clayton | |
| 4,090,526 | A | 5/1978 | Witt et al. | |
| 4,250,913 | A | 2/1981 | Scull | |
| 4,961,441 | A * | 10/1990 | Salter | G05D 16/2053 137/14 |
| 5,348,036 | A | 9/1994 | Oksanen et al. | |
| 5,660,198 | A * | 8/1997 | McClaran | G05D 16/106 137/12 |
| 6,035,878 | A * | 3/2000 | Adams | G05D 16/2095 137/1 |
| 6,935,362 | B1 * | 8/2005 | Yonnet | G05D 16/163 137/489 |
| 7,814,750 | B2 * | 10/2010 | Deeg | F16H 61/30 60/407 |
| 9,086,702 | B2 | 7/2015 | Griffin, Jr. et al. | |
| 9,176,505 | B2 | 11/2015 | Cheron et al. | |
| 2002/0036013 | A1 * | 3/2002 | Inayama | G05D 16/2024 137/487.5 |
| 2004/0261857 | A1 * | 12/2004 | Webster | G05D 16/163 137/489 |
| 2005/0265823 | A1 * | 12/2005 | Wiggins | F02C 7/277 415/151 |
| 2008/0023662 | A1 | 1/2008 | Reinicke et al. | |
| 2008/0251130 | A1 | 10/2008 | Folk | |
| 2008/0251146 | A1 | 10/2008 | Folk | |
| 2010/0071787 | A1 | 3/2010 | Folk et al. | |
| 2010/0301238 | A1 * | 12/2010 | Krake | F16K 31/1245 251/25 |
| 2013/0092259 | A1 | 4/2013 | Griffin, Jr. et al. | |
| 2014/0182694 | A1 | 7/2014 | Cheron et al. | |
| 2015/0114492 | A1 | 4/2015 | Oksanen et al. | |
| 2016/0356389 | A1 | 12/2016 | Masias et al. | |
| 2018/0314273 | A1 * | 11/2018 | Ponzo | G05D 16/2013 |

OTHER PUBLICATIONS

International Search Report and Written Opinion for PCT/US16/35625 dated Aug. 31, 2016.
PRX Series Instruction Manual, dated Oct. 2015, 12 pages.
PRX Pilot Instruction Manual, dated Jan. 2016, 8 pages.
FL Bulletin, dated Jan. 2015, 8 pages.
FL North American Bulletin, Jan. 2017, 24 pages.
6358 Instruction Manual, Apr. 2016, 4 pages.
Type EZR Instruction Manual (1), Aug. 2018, 40 pages.
Type EZR Instruction Manual (2), Dec. 2017, 12 pages.

* cited by examiner

ADJUSTABLE DEADBAND CONTROL SYSTEM

CROSS-REFERENCE TO RELATED APPLICATIONS

This application is a continuation-in-part of U.S. patent application Ser. No. 15/673,053 entitled "Adjustable Deadband Control System" and filed Aug. 9, 2017, which is a divisional of U.S. patent application Ser. No. 14/825,454, entitled "Adjustable Deadband Control System" and filed Aug. 13, 2015, which claims priority to U.S. Provisional Patent Application No. 62/170,453, entitled "Adjustable Deadband Control System" and filed Jun. 3, 2015, the entire disclosures of which are hereby incorporated by reference herein.

FIELD OF THE DISCLOSURE

This disclosure relates generally to fluid control systems and, more particularly, to control systems having adjustable deadband for back-pressure regulators or relief valves.

BACKGROUND

The pressure at which typical fluid distribution systems supply fluid may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, fluid regulators are implemented in these distribution systems in order to ensure that the delivered gas meets the requirements of the end-user facilities.

Fluid distribution systems can include a control system that has as a slam-shut device, which can operate based on a maximum downstream pressure, a minimum downstream pressure, or maximum and minimum downstream pressure. When the downstream pressure is at a normal operating value, the slam-shut device remains open. When downstream pressure varies beyond its set limits, the slam-shut device closes and prevents fluid from flowing through the fluid regulator. During an over pressure or under pressure situation of a downstream pipeline pressure, the slam-shut device is used as a secondary or tertiary protection device. However, in most applications, the slam-shut device has to be manually reset.

Current applications of non-venting over pressure protection utilize a monitor regulator or a slam shut. A monitor regulator is a normal pressure reducing regulator used in series with another pressure reducing regulator, the worker. If the worker regulator malfunctions and control pressure increases then the monitor takes over and maintains the control pressure at a slightly higher set point. Slam shuts are also used in series with the worker. If the control pressure climbs too high the slam shut will close cutting off all supply to the worker. A manual reset of the slam shut is required to reenergize the system.

Some applications want the functionality of both a monitor and a slam shut. When control pressure climbs too high the supply needs to be cut off but when the pressure drops to a safe level the device reopens.

In addition, fluid distribution systems can also include a control system that has a back-pressure regulator or relief valve, which can operate based on the upstream pressure. When the upstream pressure is below the predetermined limit, the back-pressure regulator or relief valve remains closed. When upstream pressure varies above the predetermined limit, the back-pressure regulator opens and allows the flow of fluid through the back-pressure regulator or relief valve to reduce the upstream pressure to the predetermined limit.

In certain applications, it may be desirable to have the back-pressure regulator or relief valve open at one setpoint and then close at an entirely different setpoint. For example, in a biomethane production application, it may be useful to have the back-pressure regulator or relief valve remain closed to allow the input pressure to build as the biomethane is being generated. Once a sufficient amount of biomethane has been produced (e.g., the input pressure reaches a first setpoint) the back-pressure regulator or relief valve could open to supply the biomethane and continue to supply the biomethane until input pressure reaches a second, lower, setpoint, at which point the back-pressure regulator would close to allow the build-up of the biomethane production. However, typical back-pressure regulators and relief valves are designed with a single setpoint to keep a pressure below a single predetermined value. The back-pressure regulators or relief valves will open and close at the same setpoint or pressure.

BRIEF SUMMARY OF THE DISCLOSURE

In accordance with a first exemplary aspect of the present invention, a control system comprises a pressure regulator, a first pilot, and a second pilot. The pressure regulator has a fluid inlet, a fluid outlet, and an actuator assembly having a cavity and a diaphragm assembly disposed within the cavity and dividing the cavity into a first chamber in fluid communication with the fluid outlet and a second chamber. The first pilot is in fluid communication with the second chamber of the actuator assembly and the fluid inlet and has a first setpoint. The second pilot is in fluid communication with the second chamber of the actuator assembly, the fluid inlet, and the fluid outlet and has a second setpoint that is less than the first setpoint. The first and second pilots are configured to fluidly couple the second chamber to the fluid outlet and isolate the second chamber from the fluid inlet with the control system in a first mode of operation, isolate the second chamber from the fluid outlet and the fluid inlet with the control system in a second mode of operation, and fluidly couple the second chamber to the fluid inlet with the control system in a third mode of operation.

In further accordance with the first foregoing exemplary aspect of the present invention, a control system may further include, in any combination, any one or more of the following preferred forms.

In one preferred form, the first pilot is configured to be in a closed position and the second pilot is configured to be in an open position with the control system in the first mode of operation, the first pilot is configured to be in the closed position and the second pilot is configured to be in a closed position with the control system in the second mode of operation, and the first pilot is configured to be in an open position and the second pilot is configured to be in the closed position with the control system in the third mode of operation.

In another preferred form, the control system is configured to operate in the first mode of operation with a fluid pressure at the fluid inlet below the first setpoint and below the second setpoint, the control system is configured to operate in the second mode of operation with the fluid pressure at the fluid inlet above the second setpoint and below the first setpoint, and the control system is configured to operate in the third mode of operation with the fluid pressure at the fluid inlet above the first setpoint and above the second setpoint.

In another preferred form, the fluid regulator is configured to be closed when a fluid pressure at the fluid inlet transitions from a value below the second setpoint to a value between the first setpoint and the second setpoint and configured to be open when the fluid pressure at the fluid inlet transitions from a value above the first setpoint to a value between the first setpoint and the second setpoint.

In another preferred form, the fluid regulator is configured to modulate in response to a fluid pressure at the fluid outlet with the fluid pressure at the fluid inlet greater than the first setpoint.

In another preferred form, the fluid regulator is configured to be in a closed position with a fluid pressure at the fluid inlet below the second setpoint and the fluid regulator is configured to be in an open position with the fluid pressure at the fluid inlet above the first setpoint.

In another preferred form, the fluid regulator is a back-pressure regulator.

In another preferred form, the fluid regulator comprises a spring disposed in the first chamber to urge the fluid regulator toward the closed position.

In another preferred form, the first pilot comprises an inlet in fluid communication with the fluid inlet of the fluid regulator, an outlet in fluid communication with the second pilot and the second chamber of the fluid regulator, and a first pilot sensing element in fluid communication with the fluid inlet of the fluid regulator and with a diaphragm assembly of the first pilot.

In another preferred form, the first pilot comprises a spring to urge the first pilot towards the closed position.

In another preferred form, the second pilot comprises an inlet in fluid communication with the outlet of the first pilot and the second chamber of the fluid regulator, an outlet in fluid communication with the fluid outlet of the fluid regulator, and second pilot sensing element in fluid communication with the fluid inlet of the fluid regulator and with a diaphragm assembly of the second pilot.

In another preferred form, the second pilot comprises a spring to urge the second pilot toward the open position.

In another preferred form, the control system includes a downstream fluid control device in fluid communication with the fluid outlet of the pressure regulator. The downstream fluid control device can be a second pressure regulator that is configured to control a fluid pressure downstream of the second pressure regulator.

In another preferred form, the control system includes a third pilot that is configured to supply a loading pressure to the second regulator in response to the fluid pressure downstream of the second pressure regulator.

In another preferred form, the loading pressure comprises a fluid pressure received from the second fluid inlet.

In another preferred form, the control system includes a pressure stabilizer that receives a fluid pressure at the second fluid inlet.

In another preferred form, the loading pressure is received from an output of the pressure stabilizer.

In accordance with a second exemplary aspect of the present invention, a control system comprises a first pressure regulator, a downstream fluid control device, a first pilot, and a second pilot. The first pressure regulator has a fluid inlet, a fluid outlet, and an actuator assembly comprising a cavity and a diaphragm assembly disposed within the cavity and dividing the cavity into a first chamber and a second chamber. The downstream fluid control device is configured to control a fluid pressure downstream of the second pressure regulator and has a second fluid inlet in fluid communication with the fluid outlet of the first pressure regulator and a second fluid outlet in fluid communication with the first chamber of the first pressure regulator. The first pilot is in fluid communication with the second chamber of the actuator assembly and the fluid inlet and has a first setpoint. The second pilot is in fluid communication with the second chamber of the actuator assembly, the fluid inlet, and the second fluid outlet and has a second setpoint that is less than the first setpoint. The first and second pilots are configured to fluidly couple the second chamber to the second fluid outlet with the control system in a first mode of operation, isolate the second chamber from the second fluid outlet and the fluid inlet with the control system in a second mode of operation, and fluidly couple the second chamber to the fluid inlet with the control system in a third mode of operation.

In further accordance with the second foregoing exemplary aspect of the present invention, a control system may further include, in any combination, any one or more of the following preferred forms.

In one preferred form, the first pilot is configured to be in a closed position and the second pilot is configured to be in an open position with the control system in the first mode of operation, the first pilot is configured to be in the closed position and the second pilot is configured to be in a closed position with the control system in the second mode of operation, and the first pilot is configured to be in an open position and the second pilot is configured to be in the closed position with the control system in the third mode of operation.

In another preferred form, the control system is configured to operate in the first mode of operation with a fluid pressure at the fluid inlet below the first setpoint and below the second setpoint, the control system is configured to operate in the second mode of operation with the fluid pressure at the fluid inlet above the second setpoint and below the first setpoint, and the control system is configured to operate in the third mode of operation with the fluid pressure at the fluid inlet above the first setpoint and above the second setpoint.

In another preferred form, the fluid regulator is configured to be closed when a fluid pressure at the fluid inlet transitions from a value below the second setpoint to a value between the first setpoint and the second setpoint and configured to be open when the fluid pressure at the fluid inlet transitions from a value above the first setpoint to a value between the first setpoint and the second setpoint.

In another preferred form, the fluid regulator is configured to be open in response to a fluid pressure at the second fluid outlet with the fluid pressure at the fluid inlet greater than the first setpoint.

In another preferred form, the fluid regulator is configured to be in a closed position with a fluid pressure at the fluid inlet below the second setpoint and the fluid regulator is configured to be in an open position with the fluid pressure at the fluid inlet above the first setpoint.

In another preferred form, the fluid regulator is a back-pressure regulator.

In another preferred form, the first pilot comprises an inlet in fluid communication with the fluid inlet of the fluid regulator, an outlet in fluid communication with the second pilot and the second chamber of the fluid regulator, and an actuator cavity in fluid communication with the fluid inlet of the fluid regulator.

In another preferred form, the second pilot comprises an inlet in fluid communication with the outlet of the first pilot and the second chamber of the fluid regulator, an outlet in fluid communication with the second fluid outlet of the second fluid regulator, and an actuator cavity in fluid communication with the fluid inlet of the fluid regulator.

DETAILED DESCRIPTION

The control systems shown in FIGS. 1-5 allow the pressure regulator to limit pressure downstream while also letting the downstream pressure decay to a preset lower limit. The control systems have the quick shutting advantages of a slamshut bubble tight system and can automatically reset to normal operating conditions without manual manipulation. Some of the control systems shown herein can also create a pilot deadband that is adjustable for different setpoints.

Figure 1:
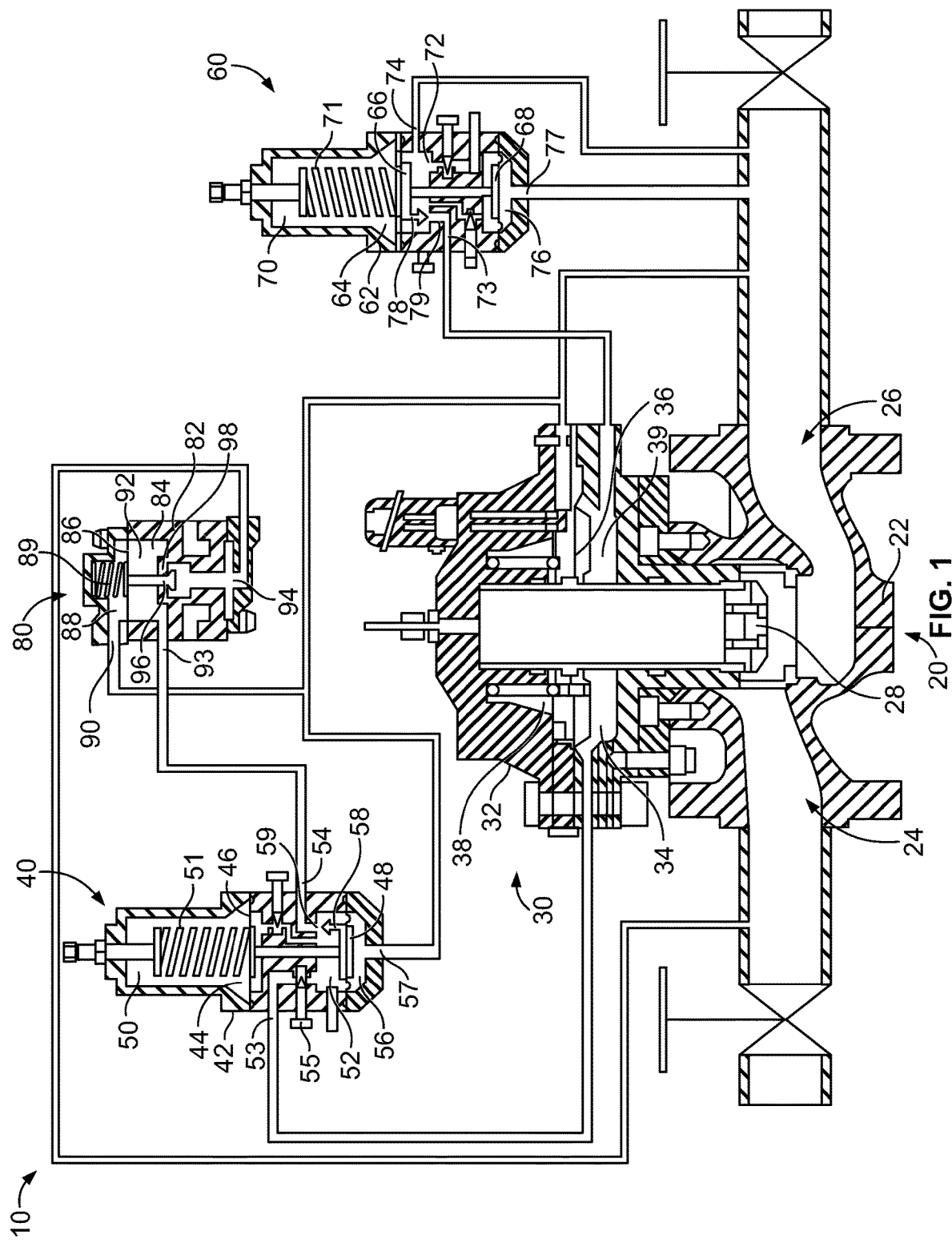
FIG. 1 is a schematic view of an example control system having an adjustable deadband for over pressure protection.

Referring to FIG. 1, one example of a control system 10 provides over pressure protection at the outlet of the pressure regulator and provides for automatic reset of the pressure regulator. Control system 10 generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator. In the example shown in FIG. 1, pressure regulator 20 has a body 22 and an actuator assembly 30. Body 22 defines fluid inlet 24, fluid outlet 26, and valve seat 25 between fluid inlet 24 and fluid outlet 26. Valve plug 28 is movable within body 22 between an open position, where valve plug 28 is spaced from valve seat 25 and a process fluid is allowed to flow through pressure regulator 20 from fluid inlet 24 to fluid outlet 26, and a closed position, where valve plug 28 sealing engages valve seat 25 and the process fluid is prevented from flowing through pressure regulator 20. Actuator assembly 30 includes housing 32, which defines cavity 34, and diaphragm assembly 36 disposed within cavity 34 to divide cavity 34 into first chamber 38 and second chamber 39. Diaphragm assembly 36 is operatively connected to valve plug 28 such that valve plug 28 moves with diaphragm assembly 36 to move valve plug 28 into and out of sealing engagement with valve seat 25.

First pilot 40 is a standard spring to open pilot, such as a Tartarini® PRX 120 Pilot. In the example shown in FIG. 1, first pilot 40 includes housing 42, which defines cavity 44. First and second diaphragm assemblies 46, 48 are disposed in cavity 44 to divide cavity 44 into first chamber 50, second chamber 52, and third chamber 56. Biasing member 51, such as a compression spring, is positioned in first chamber 50 to bias first pilot 40 into an open position. First port 53 is formed in housing 42 and is in fluid communication with second chamber 52 and with second chamber 39 of actuator assembly 30 of pressure regulator 20. Second port 54 is formed in housing 42 and is also in fluid communication with second chamber 52 and with pressure stabilizer 80. Third port 57 is formed in housing 42 and is in fluid communication with third chamber 56 and with fluid outlet 26 of pressure regulator 20. Second diaphragm assembly 48 also includes a plug 58 that moves with second diaphragm assembly 48. Plug 58 is movable between an open position, in which plug 58 is spaced apart from seat 59 and fluid is allowed to flow through second port 54, and a closed position, in which plug 58 is sealing engages with seat 59 and fluid is prevented from flowing through second port 54.

Second pilot 60 is a standard spring to close pilot, such as a Tartarini® PRX 131 Pilot. In the example shown in FIG. 1, second pilot 60 includes housing 62, which defines cavity 64. First and second diaphragm assemblies 66, 68 are disposed in cavity 64 to divide cavity 64 into first chamber 70, second chamber 72, and third chamber 76. Biasing member 71, such as a compression spring, is positioned in first chamber 70 to bias second pilot 60 into a closed position. First port 73 is formed in housing 62 and is in fluid communication with second chamber 72 and with second chamber 39 of actuator assembly 30 of pressure regulator 20. Second port 74 is formed in housing 62 and is also in fluid communication with second chamber 72 and with fluid outlet 26 of pressure regulator 20. Third port 77 is formed in housing 62 and is in fluid communication with third chamber 76 and with fluid outlet 26 of pressure regulator 20. First diaphragm assembly 66 also includes plug 78 that moves with first diaphragm assembly 66. Plug 78 is movable between an open position, in which plug 78 is spaced apart from seat 79 and fluid is allowed to flow through second port 74, and a closed position, in which plug 78 sealing engages seat 79 and fluid is prevented from flowing through second port 74.

Pressure stabilizer 80 is a standard pressure stabilizer, such as a Tartarini® Type SA/2 Pressure Stabilizer. Alternatively, an additional pilot could be used in place of pressure stabilizer 80 or pressure stabilizer 80 could be removed and second port 54 of first pilot 40 could be connected directly to fluid inlet 24 or to another pressurized fluid source. In the example shown in FIG. 1, pressure stabilizer 80 includes housing 82, which defines cavity 84. Diaphragm assembly 86 is disposed in cavity 84 to divide cavity 84 into first chamber 88 and second chamber 92. Biasing member 89, such as a compression spring, is positioned in first chamber 88 to bias pressure stabilizer 80 into an open position. First port 90 is formed in housing 82 and is in fluid communication with first chamber 88 and with fluid outlet 26 of pressure regulator 20. Second port 93 is formed in housing 82 and is in fluid communication with second chamber 92 and with second chamber 52 of first pilot 40, through second port 54. Third port 94 is formed in housing 82 and is in fluid communication with second chamber 92 through seat 98, when plug 96 is spaced apart from seat 98, and with fluid inlet 24 of pressure regulator 20 or with another pressurized fluid source. Diaphragm assembly 86 is operatively connected to plug 96, which moves with diaphragm assembly 86. Plug 96 is movable between an open position, in which plug 96 is spaced apart from seat 98 and fluid is allowed to flow through third port 94, and a closed position, in which plug 96 sealing engages seat 98 and fluid is prevented from flowing through third port 94. In the example shown, pressure stabilizer 80 delivers a pilot supply pressure to first pilot 40.

In operation, first pilot 40 could be set to a first setpoint (e.g., 60 psig), which could be the pressure at which pressure regulator 20 would reset and move from a closed to an open position. In addition, second pilot 60 could be set to a second setpoint (e.g., 70 psig), typically higher than the first setpoint, which could be the pressure at which pressure regulator 20 would move from the open to the closed position. In this example, the dead band for control system 10 is set by setting the setpoint for first pilot 40 below the setpoint for second pilot 60.

During normal operations, the pressure of the process fluid at the fluid outlet 26 of pressure regulator 20 would be below both the first and second setpoints. When the fluid pressure at outlet 26 is below both the first and second setpoints, first pilot 40 is in the open position, second pilot 60 is in the closed position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 increases and becomes greater than the first setpoint (but still less than the second setpoint), first pilot 40 will move from the open position to the closed position, trapping pressure in second chamber 39 of actuator assembly 30 between second pilot 60 and first pilot 40. In the closed position, second diaphragm assembly 48 will move plug 58 into sealing engagement with seat 59 and prevent the flow of pressurized fluid from pressure stabilizer 80 into second chamber 52 of first pilot 40. Pressure regulator 20 will still be in the open position.

As the pressure of the process fluid at fluid outlet 26 continues to increase and becomes greater than the second setpoint, second pilot 60 will move from closed to open positions. In the open position of second pilot 60, second pilot 60 dumps the trapped pressure to a downstream location, causing pressure regulator 20 to close. First diaphragm assembly 66 of second pilot 60 will move plug 78 away from seat 79 and allow the flow of pressurized fluid from second chamber 39 of actuator assembly 30, through second chamber 72 of second pilot 60, and out second port 74 into fluid outlet 26, or otherwise into the downstream flow of the process fluid. The drop in pressure in second chamber 39 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

With pressure regulator 20 in the closed position, the pressure at fluid outlet 26 will decrease. As the pressure of the process fluid at fluid outlet 26 decreases and drops below the second setpoint of second pilot 60 (but still above the first setpoint of first pilot 40), second pilot 60 will move from the open to the closed position, which prevents the flow of fluid from second chamber 39 of actuator assembly 30 to fluid outlet 26 or otherwise downstream from fluid outlet 26. Pressure regulator 20 remains in the closed position.

As the pressure of the process fluid at fluid outlet 25 continues to decrease and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. First pilot 40 can also include restrictor 55 to adjust the filling speed of second chamber 39 to any desired speed.

Figure 2:
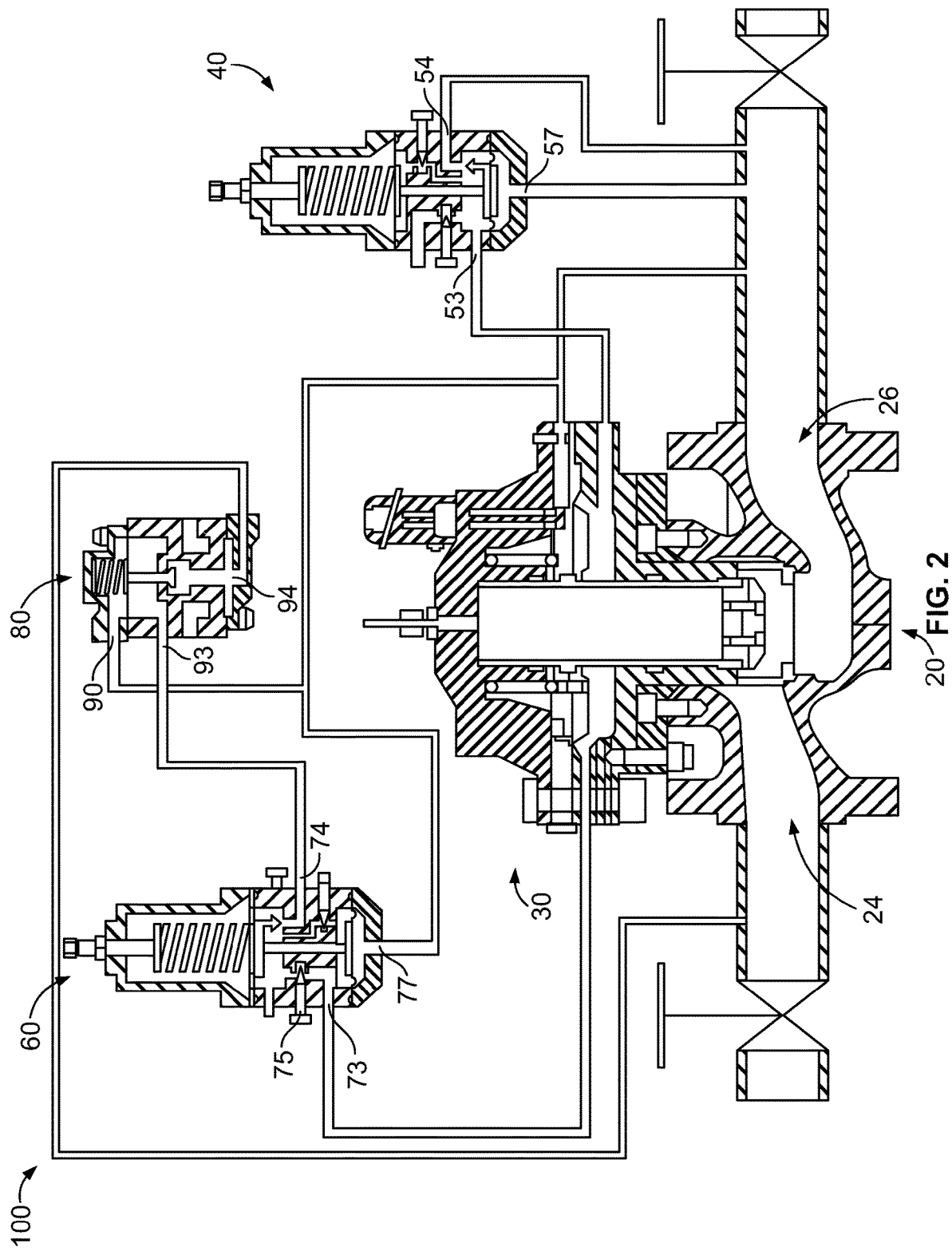
FIG. 2 is a schematic view of an example control system having an adjustable deadband for under pressure protection.

Referring to FIG. 2, another example of a control system 100 provides under pressure protection at the outlet of the pressure regulator and provides for automatic reset of the pressure regulator. Control system 100 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 2, first port 53 of first pilot 40 is in fluid communication with second chamber 39 of actuator assembly 30 of pressure regulator and second port 54 and third port 57 are in fluid communication with fluid outlet 26 of pressure regulator 20.

Second pilot 60 is a standard spring to close pilot, such as a Tartarini® PRX 131 Pilot, as described above. However, in the example shown in FIG. 2, first port 73 is in fluid communication with second chamber 39 of actuator assembly 30 of pressure regulator 20, second port 74 is in fluid communication with pressure stabilizer 80, and third port 77 is in fluid communication with fluid outlet 26 of pressure regulator 20.

Pressure stabilizer 80 is a standard pressure stabilizer, such as a Tartarini® Type SA/2 Pressure Stabilizer, as described above. However, in the example shown in FIG. 2, first port 90 is in fluid communication with fluid outlet 26 of pressure regulator 20, second port 93 is in fluid communication with second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 could be connected directly to fluid inlet 24 or to another pressurized fluid source. In the example shown, pressure stabilizer delivers a pilot supply pressure to second pilot 60.

In operation, first pilot 40 could be set to a first setpoint (e.g., 30 psig), which could be the pressure at which pressure regulator 20 would move from the open to the closed position. In addition, second pilot 60 could be set to a second setpoint (e.g., 40 psig), typically higher than the first setpoint, which could be the pressure at which pressure regulator 20 would reset and move from a closed to an open position. In this example, the deadband for control system 10 is set by setting the setpoint for first pilot 40 below the setpoint for second pilot 60.

During normal operations, the pressure of the process fluid at the fluid outlet 26 of pressure regulator 20 would be above both the first and second setpoints. When the fluid pressure at outlet 26 is above both the first and second setpoints, first pilot 40 is in the closed position and second pilot 60 is in the open position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 decreases and becomes less than the first setpoint (but still greater than the second setpoint), second pilot 60 will move from the open position to the closed position, trapping pressure in second chamber 39 of actuator assembly 30 between second pilot 60 and first pilot 40. In the closed position, first diaphragm assembly 66 will move plug 78 into sealing engagement with seat 79 and prevent the flow of pressurized fluid from pressure stabilizer 80 into second chamber 72 of second pilot 60. Pressure regulator 20 will still be in the open position.

As the pressure of the process fluid at fluid outlet 26 continues to decrease and becomes less than the second setpoint, first pilot 40 will move from closed to open positions. In the open position of first pilot 40, first pilot 40 dumps the trapped pressure to a downstream location, causing pressure regulator 20 to close. Second diaphragm assembly 48 of first pilot 40 will move plug 58 away from seat 59 and allow the flow of pressurized fluid from second chamber 39 of actuator assembly 30, through second chamber 52 of first pilot 40, and out second port 54 into fluid outlet 26, or otherwise into the downstream flow of the process fluid. The drop in pressure in second chamber 39 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

As the pressure of the process fluid at fluid outlet 26 increases above the second setpoint of first pilot 40 (but still below the first setpoint of second pilot 60), first pilot 40 will move from the open to the closed position, which prevents the flow of fluid from second chamber 39 of actuator assembly 30 to fluid outlet 26 or otherwise downstream from fluid outlet 26. Pressure regulator 20 remains in the closed position.

As the pressure of the process fluid at fluid outlet 25 continues to increase above the first setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Second pilot 60 can also include restrictor 75 to adjust the filling speed of second chamber 39 to any desired speed.

A control system having both over and under pressure protection can also be provided by placing first pilot 40 of FIG. 1 in series with second pilot 60 of FIG. 2 and second pilot 60 of FIG. 1 in parallel with first pilot 40 of FIG. 2.

Figure 3:
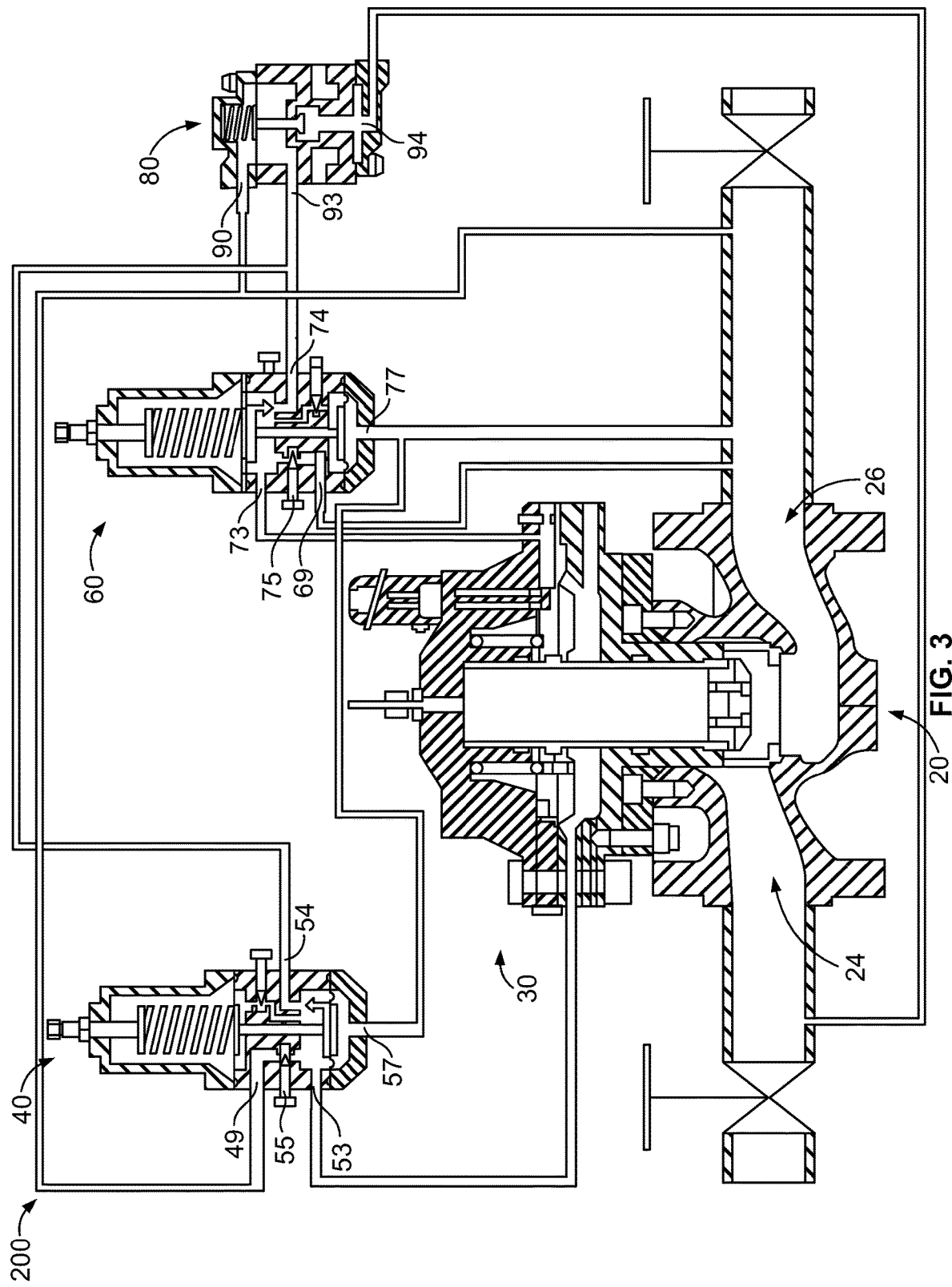
FIG. 3 is a schematic view of an example control system having pressure assisted closure for over pressure protection.

Referring to FIG. 3, another example of a control system 200 provides over pressure protection at the outlet of the pressure regulator, pressure assisted closure of the pressure regulator, and automatic reset of the pressure regulator. Control system 200 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 3, first port 53 of first pilot 40 is in fluid communication with second chamber 39 of actuator assembly 30 of pressure regulator 20, second port 54 is in fluid communication with pressure stabilizer 80, and third port 57 is in fluid communication with fluid outlet 26 of pressure regulator 20. In addition, a fourth port 49 is in fluid communication with second chamber 52 and with fluid outlet 26 and the flow of fluid through fourth port 49 can be controlled with restrictor 55.

Second pilot 60 is a standard spring to close pilot, such as a Tartarini® PRX 131 Pilot, as described above. However, in the example shown in FIG. 3, first port 73 is in fluid communication with first chamber 38 of actuator assembly 30, second port 74 is in fluid communication with pressure stabilizer 80, and third port 77 is in fluid communication with fluid outlet 26 of pressure regulator 20. In addition, a fourth port 69 is in fluid communication with second chamber 72 and with fluid outlet 26 and the flow of fluid through fourth port 69 can be controlled with restrictor 75.

Pressure stabilizer 80 is a standard pressure stabilizer, such as a Tartarini® Type SA/2 Pressure Stabilizer, as described above. However, in the example shown in FIG. 3, first port 90 is in fluid communication with fluid outlet 26 of pressure regulator 20, second port 93 is in fluid communication with both first pilot 40 and second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 and second port 74 of second pilot 60 could be connected directly to fluid inlet 24 or to another pressurized fluid source. In the example shown, pressure stabilizer 80 delivers a pilot supply pressure to both first pilot 40 and second pilot 60.

In operation, first pilot 40 could be set to a first setpoint, which could be the pressure at which pressure regulator 20 would reset and move from a closed to an open position. In addition, second pilot 60 could be set to a second setpoint, typically higher than the first setpoint, which could be the pressure at which pressure regulator 20 would move from the open to the closed position.

During normal operations, the pressure of the process fluid at the fluid outlet 26 of pressure regulator 20 would be below both the first and second setpoints. When the fluid pressure at outlet 26 is below both the first and second setpoints, first pilot 40 is in the open position and second pilot 60 is in the closed position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 increases and becomes greater than the first setpoint (but still less than the second setpoint), first pilot 40 will move from the open position to the closed position, trapping pressure in second chamber 39 of actuator assembly 30 and cutting off the flow of pressurized fluid from pressure stabilizer 80 to second chamber 39 of actuator assembly 30. In the closed position, second diaphragm assembly 48 will move plug 58 into sealing engagement with seat 59 and prevent the flow of pressurized fluid from pressure stabilizer 80 into second chamber 52 of first pilot 40. Pressure in second chamber 39 can also be reduced by bleeding a portion of the pressurized fluid from second chamber 39 through fourth port 49 in first pilot 40 via restrictor 55. Pressure regulator 20 will still be in the open position.

As the pressure of the process fluid at fluid outlet 26 continues to increase and becomes greater than the second setpoint, second pilot 60 will move from the closed to the open position. In the open position of second pilot 60, second pilot 60 allows pressurized fluid from pressure stabilizer 80 to flow through second chamber 72 and into first chamber 38 of actuator assembly 30, causing pressure regulator 20 to close. First diaphragm assembly 66 of second pilot 60 will move plug 78 away from seat 79 and allow the flow of pressurized fluid from pressure stabilizer 80, through second chamber 72 of second pilot 60, and out first port 73 into first chamber 38. The increase in pressure in first chamber 38 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

With pressure regulator 20 in the closed position, the pressure at fluid outlet 26 will decrease. As the pressure of the process fluid at fluid outlet 26 decreases and drops below the second setpoint of second pilot 60 (but still above the first setpoint of first pilot 40), second pilot 60 will move from the open to the closed position, which prevents the flow of fluid from pressure stabilizer 80 to first chamber 38 of actuator assembly 30. Pressure regulator 20 remains in the closed position.

As the pressure of the process fluid at fluid outlet 26 continues to decrease and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Pressure in first chamber 38 can also be reduced by bleeding a portion of the pressurized fluid from first chamber 38 through fourth port 69 in second pilot 60 via restrictor 75. Second pilot 60 is constantly bleeding loading pressure to fluid outlet 26 or to another downstream location, but very slowly.

Figure 4:
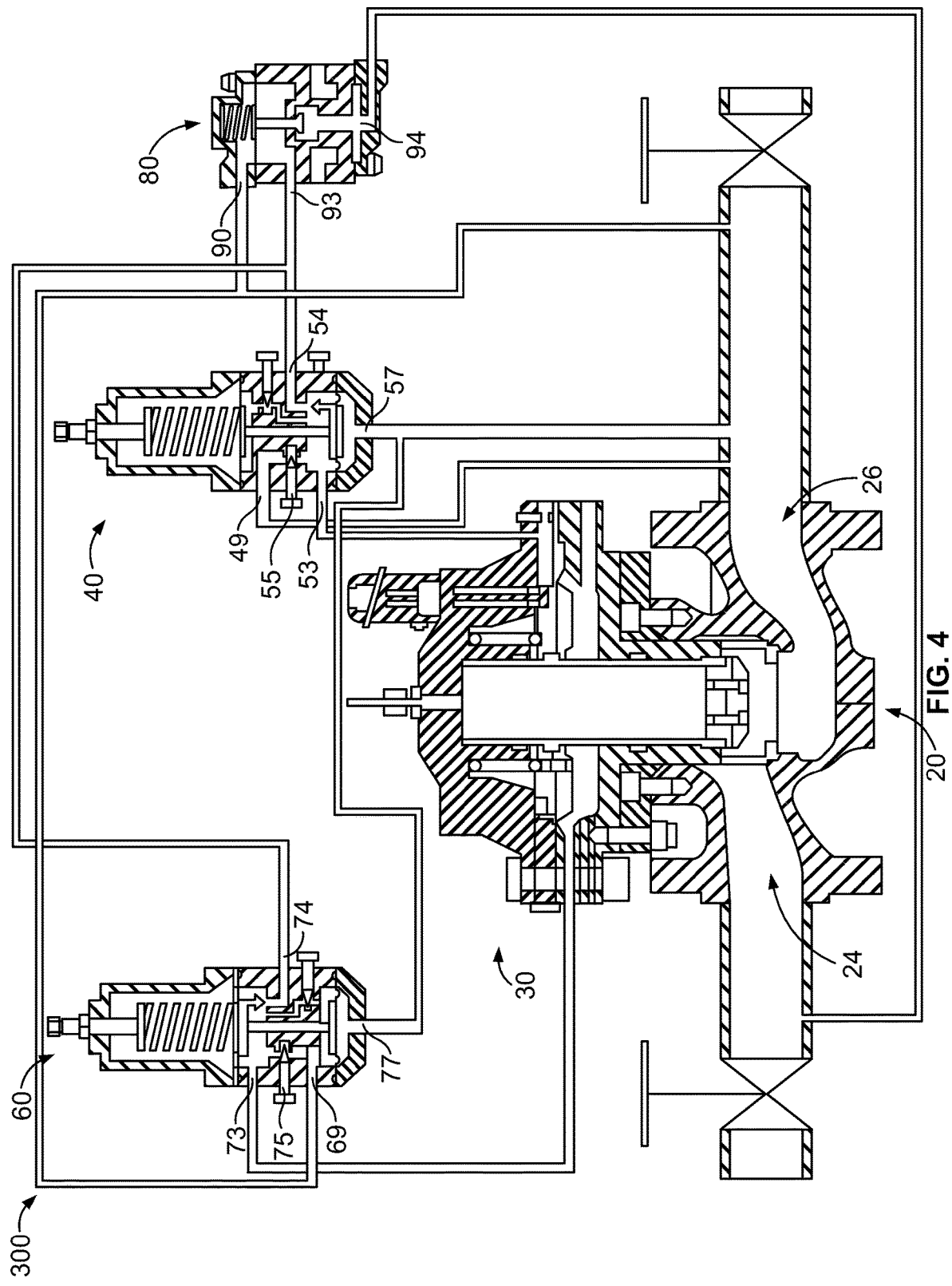
FIG. 4 is a schematic view of an example control system having pressure assisted closure for under pressure protection.

Referring to FIG. 4, another example of a control system 300 provides under pressure protection at the outlet of the pressure regulator, pressure assisted closure of the pressure regulator, and automatic reset of the pressure regulator. Control system 300 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 4, first port 53 of first pilot 40 is in fluid communication with first chamber 38 of actuator assembly 30, second port 54 is in fluid communication with pressure stabilizer 80, and third port 57 is in fluid communication with fluid outlet 26 of pressure regulator 20. In addition, a fourth port 49 is in fluid communication with fluid outlet 26 and the flow of fluid through fourth port 49 can be controlled with restrictor 55.

Second pilot 60 is a standard spring to close pilot, such as a Tartarini® PRX 131 Pilot, as described above. However, in the example shown in FIG. 4, first port 73 is in fluid communication with second chamber 39 of actuator assembly 30, second port 74 is in fluid communication with pressure stabilizer 80, and third port 77 is in fluid communication with fluid outlet 26 of pressure regulator 20. In addition, a fourth port 69 is in fluid communication with fluid outlet 26 and the flow of fluid through fourth port 69 can be controlled with restrictor 75.

Pressure stabilizer 80 is a standard pressure stabilizer, such as a Tartarini® Type SA/2 Pressure Stabilizer, as described above. However, in the example shown in FIG. 4, first port 90 is in fluid communication with fluid outlet 26 of pressure regulator 20, second port 93 is in fluid communication with both first pilot 40 and second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 and second port 74 of second pilot 60 could be connected directly to fluid inlet 24 or to another pressurized fluid source. In the example shown, pressure stabilizer 80 delivers a pilot supply pressure to both first pilot 40 and second pilot 60.

In operation, first pilot 40 could be set to a first setpoint, which could be the pressure at which pressure regulator 20 would move from the open to the closed position. In addition, second pilot 60 could be set to a second setpoint, typically higher than the first setpoint, which could be the pressure at which pressure regulator 20 would reset and move from a closed to an open position.

During normal operations, the pressure of the process fluid at the fluid outlet 26 of pressure regulator 20 would be above both the first and second setpoints. When the fluid pressure at outlet 26 is above both the first and second setpoints, first pilot 40 is in the closed position and second pilot 60 is in the open position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 decreases and becomes less than the second setpoint (but still greater than the first setpoint), second pilot 60 will move from the open position to the closed position, trapping pressure in second chamber 39 of actuator assembly 30 and cutting off the flow of pressurized fluid from pressure stabilizer 80 to second chamber 39 of actuator assembly 30. In the closed position, first diaphragm assembly 66 will move plug 78 into sealing engagement with seat 79 and prevent the flow of pressurized fluid from pressure stabilizer 80 into second chamber 72 of second pilot 60. Pressure in second chamber 39 can also be reduced by bleeding a portion of the pressurized fluid from second chamber 39 through fourth port 69 in second pilot 60 via restrictor 75. Pressure regulator 20 will still be in the open position.

As the pressure of the process fluid at fluid outlet 26 continues to decrease and becomes less than the first setpoint, first pilot 40 will move from the closed to the open position. In the open position of first pilot 40, first pilot 40 allows pressurized fluid from pressure stabilizer 80 to flow through second chamber 52 and into first chamber 38 of actuator assembly 30, causing pressure regulator 20 to close. Second diaphragm assembly 48 of first pilot 40 will move plug 58 away from seat 59 and allow the flow of pressurized fluid from pressure stabilizer 80, through second chamber 52 of first pilot 40, and out first port 53 into first chamber 38. The increase in pressure in first chamber 38 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

As the pressure of the process fluid at fluid outlet 26 increases above the first setpoint of first pilot 40 (but still below the second setpoint of second pilot 60), first pilot 40 will move from the open to the closed position, which prevents the flow of fluid from pressure stabilizer 80 to first chamber 38 of actuator assembly 30. Pressure regulator 20 remains in the closed position.

As the pressure of the process fluid at fluid outlet 26 continues to increase above the second setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Pressure in first chamber 38 can also be reduced by bleeding a portion of the pressurized fluid from first chamber 38 through fourth port 49 in first pilot 40 via restrictor 55. First pilot 40 is constantly bleeding loading pressure to fluid outlet 26 or to another downstream location, but very slowly.

A control system having pressure assisted closure and both over and under pressure protection can also be provided by placing first pilot 40 of FIG. 3 in series with second pilot 60 of FIG. 4 and second pilot 60 of FIG. 3 in parallel with first pilot 40 of FIG. 4.

Figure 5:
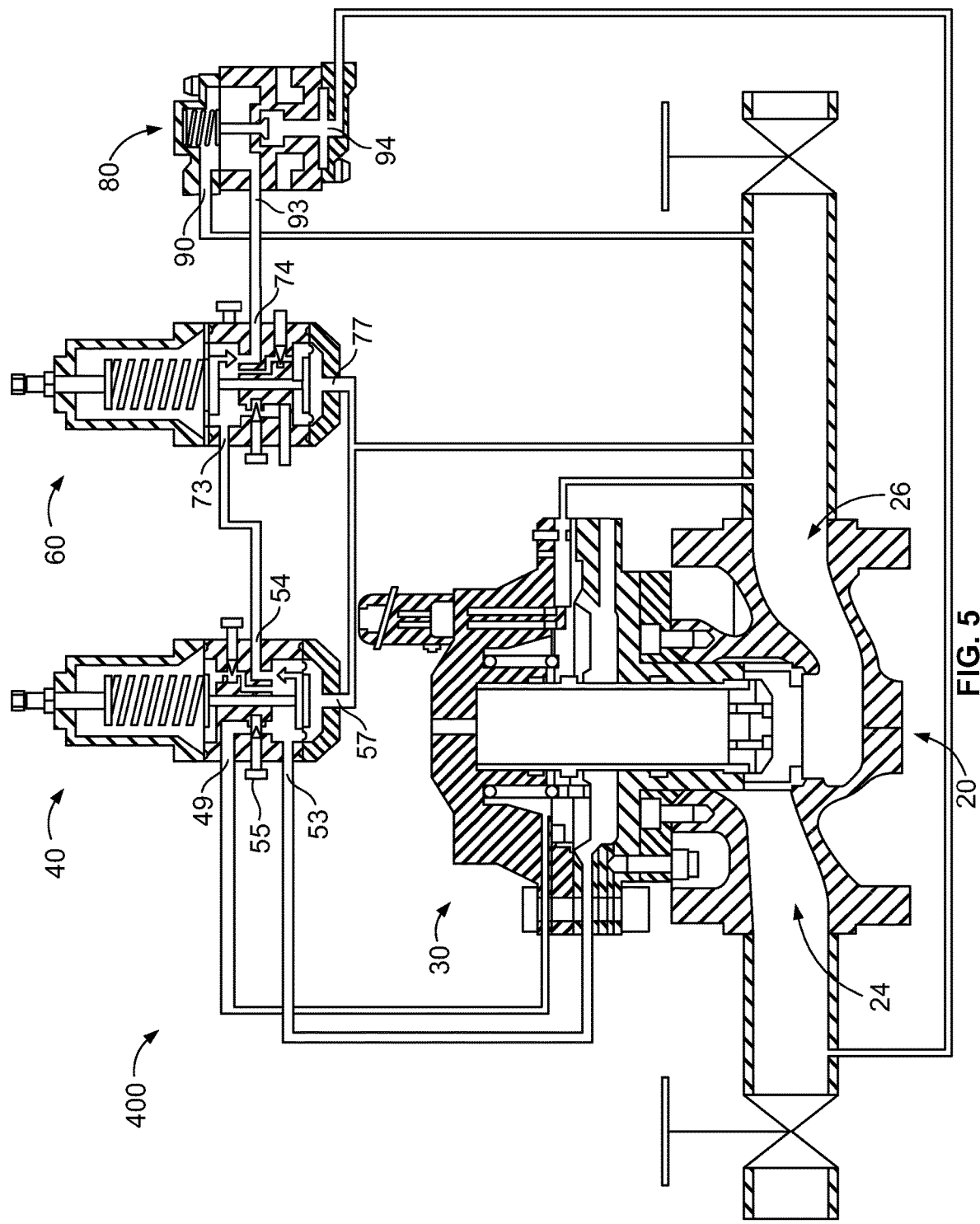
FIG. 5 is a schematic view of an example control system having spring to close for over and under pressure protection.

Referring to FIG. 5, one example of a control system 400 provides over and under pressure protection at the outlet of the pressure regulator and provides for automatic reset of the pressure regulator. Control system 400 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 5, first port 53 of first pilot 40 is in fluid communication with second chamber 39 of actuator assembly 30, second port 54 is in fluid communication with second pilot 60, and third port 57 is in fluid communication with fluid outlet 26 of pressure regulator 20. In addition, a fourth port 49 is in fluid communication with first chamber 38 of actuator assembly 30 and the flow of fluid through fourth port 49 can be controlled with restrictor 55. In this example, first pilot 40 is the over pressure shut off pilot.

Second pilot 60 is a standard spring to close pilot, such as a Tartarini® PRX 131 Pilot, as described above. However, in the example shown in FIG. 5, first port 73 is in fluid communication with first pilot 40, second port 74 is in fluid communication with pressure stabilizer 80, and third port 77 is in fluid communication with fluid outlet 26 of pressure regulator 20. In this example, second pilot 60 is the under pressure shut off pilot.

Pressure stabilizer 80 is a standard pressure stabilizer, such as a Tartarini® Type SA/2 Pressure Stabilizer, as described above. However, in the example shown in FIG. 5, first port 90 is in fluid communication with fluid outlet 26 of pressure regulator 20, second port 93 is in fluid communication with second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 74 of second pilot 60 could be connected directly to fluid inlet 24 or to another pressurized fluid source. In the example shown, pressure stabilizer 80 delivers a pilot supply pressure to hold pressure regulator 20 in the open position.

In operation, first pilot 40 could be set to a first setpoint, which could be the over pressure protection point. In addition, second pilot 60 could be set to a second setpoint, lower than the first setpoint, which could be the under pressure protection point.

During normal operations, the pressure of the process fluid at the fluid outlet 26 of pressure regulator 20 would be between the first and second setpoints. When the fluid pressure at outlet 26 is between the first and second setpoints, first pilot 40 and second pilot 60 are in the open position. With first pilot 40 and second pilot 60 in the open position, the fluid from pressure from pressure stabilizer 80 flows through first pilot 40 and second pilot 60 and to second chamber 39 of actuator assembly 30. In this state, the force generated on diaphragm assembly 36 by the pressure in second chamber 39 is greater than the force generated on diaphragm assembly 36 by biasing member 35, such as a spring. Therefore, pressure regulator 20 remains in the open position.

If the pressure of the process fluid at fluid outlet 26 increases and becomes greater than the first setpoint, first pilot 40 will move from the open position to the closed position, preventing pressurized fluid from pressure stabilizer 80 from being supplied to second chamber 39. In the closed position, second diaphragm assembly 48 will move plug 58 into sealing engagement with seat 59 and prevent the flow of pressurized fluid from pressure stabilizer 80 into second chamber 52 of first pilot 40. The pressure from second chamber 39 will bleed downstream through fourth port 49 in first pilot 40. The drop in pressure in second chamber 39 will create an imbalance in the forces acting on diaphragm assembly 36, and biasing member 35 moves valve plug 28 into sealing engagement with valve seat 25, placing pressure regulator 20 in the closed position and preventing the flow of the process fluid through pressure regulator 20. Second pilot 60 remains in the open position since the pressure of the process fluid at fluid outlet 26 is still above the second setpoint.

With pressure regulator 20 in the closed position, the pressure at fluid outlet 26 will decrease. As the pressure of the process fluid at fluid outlet 26 decreases and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position.

On the contrary, if the pressure of the process fluid at fluid outlet 25 decreases and becomes less than the second setpoint, second pilot 60 will move from the open position to the closed position, preventing pressurized fluid from pressure stabilizer 80 from being supplied to second chamber 39. In the closed position, first diaphragm assembly 66 will move plug 78 into sealing engagement with seat 79 and prevent the flow of pressurized fluid from pressure stabilizer 80 into second chamber 72 of second pilot 60. The pressure from second chamber 39 will bleed downstream through fourth port 49 in first pilot 40. The drop in pressure in second chamber 39 will create an imbalance in the forces acting on diaphragm assembly 36, and biasing member 35 moves valve plug 28 into sealing engagement with valve seat 25, placing pressure regulator 20 in the closed position and preventing the flow of the process fluid through pressure regulator 20. First pilot 40 remains in the open position since the pressure of the process fluid at fluid outlet 26 is still below the first setpoint.

As the pressure of the process fluid at fluid outlet 26 increases and rises above the second setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position.

If over pressure or under pressure is required only, then either first pilot 40 or second pilot 60 could be removed to provide a self-resetting control system having only over pressure protection or only under pressure protection.

Control systems 10, 100, 200, 300, 400 provide much improved methods of achieving auto reset slamshut or adjustable deadband over using shuttle valves or switch valves, which are not fully rated to inlet pressure. Using the systems described above, normal pressure reducing and pressure relief pilots can be used that are rated to the full inlet of the pressure regulator. This full rating increases the overall safety of the control system while still allowing the proper adjustable maximum and minimum setpoints.

In addition, control systems 10, 100, 200, 300, 400 could also be provided with sensors or electronic monitoring systems to allow remote status update of control systems 10, 100, 200, 300, 400. In addition, although control systems 10, 100, 200, 300, 400 have been shown as a combination of separate pressure regulators, pilots, and pressure stabilizers, the entire control system could be merged into a single body instead of separate elements. Furthermore, although control systems 10, 100, 200, 300, 400 could also be adapted for use with rotary actuators by use of a pressure or electronic signal.

The control systems shown in FIGS. 6-9 allow the pressure regulator, such as a back-pressure regulator or relief valve, to allow the upstream pressure to build to a preset upper limit before allowing the flow of fluid, while also allowing the upstream pressure to decay to a preset lower limit before closing. These control system create a deadband between the upper limit at which the pressure regulator opens and the lower limit at which it closes that is adjustable for different setpoints.

Figure 6:
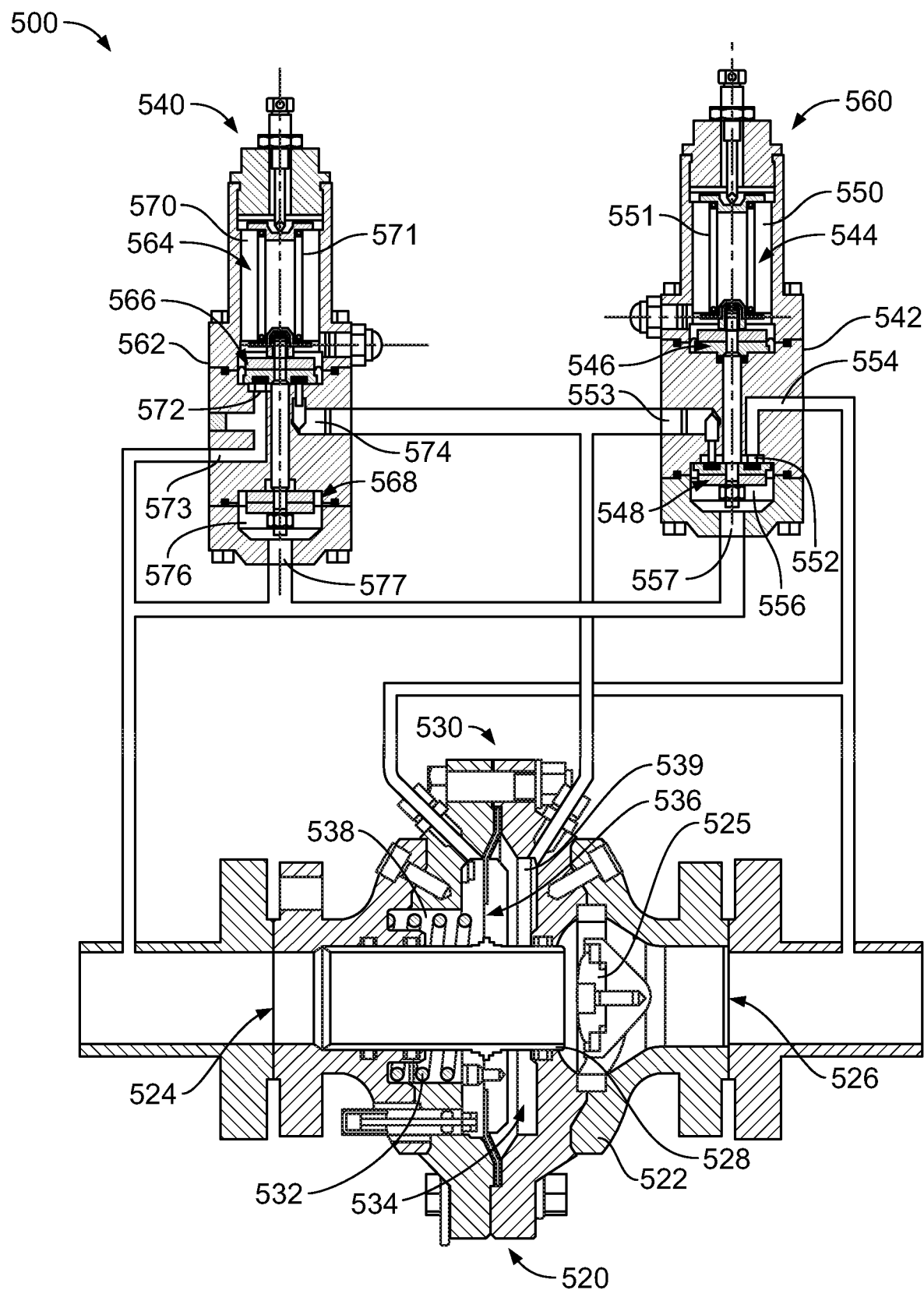
FIG. 6 is a schematic view of an example control system having an adjustable deadband for back pressure regulators or relief valves.

Referring to FIG. 6, an example of a control system 500 is shown having an adjustable deadband for back pressure regulators or relief valves that allows for opening of the pressure regulator at one pressure and closing at a different pressure. Control system 500 can also prevent fluid pressure from traveling back through the pressure regulator, essentially doubling as a check valve. Control system 500 generally includes a pressure regulator 520, a first pilot 540, and a second pilot 560.

Pressure regulator 520 is a standard back-pressure regulator or relief valve, such as a Tartarini® Type FL Back-pressure Regulator. In the example shown in FIG. 6, pressure regulator 520 has a body 522 and an actuator assembly 530. Body 522 defines fluid inlet 524, fluid outlet 526, and valve seat 525 between fluid inlet 524 and fluid outlet 526. Valve plug 528 is movable within body 522 between an open position, where valve plug 528 is spaced from valve seat 525 and a process fluid is allowed to flow through pressure regulator 520 from fluid inlet 524 to fluid outlet 526, and a closed position, where valve plug 528 sealing engages valve seat 525 and the process fluid is prevented from flowing through pressure regulator 520. Actuator assembly 530 defines cavity 534 and diaphragm assembly 536 is disposed within cavity 534 to divide cavity 534 into first chamber 538, which is in fluid communication with fluid outlet 526, and second chamber 539, which is in fluid communication with second port 574 of first pilot and first port 553 of second pilot 560. Diaphragm assembly 536 is operatively connected to valve plug 528 such that valve plug 528 moves with diaphragm assembly 536 to move valve plug 528 into and out of sealing engagement with valve seat 525. Biasing member 532, such as a compression spring, is disposed in first chamber 538 to bias valve plug 528 of pressure regulator 520 towards the closed position.

First pilot 540 is a standard spring to close pilot, such as a Tartarini® PRX/182. In the example shown in FIG. 6, first pilot 540 includes housing 562, which defines cavity 564. First and second diaphragm assemblies 566, 568 are disposed in cavity 564 to divide cavity 564 into first chamber 570, second chamber 572, and third chamber 576. Biasing member 571, such as a compression spring, is positioned in first chamber 570 to bias first pilot 540 into a closed position. First port 573 is formed in housing 562 and is in fluid communication with fluid inlet 524 of fluid regulator 520. Second port 574 is formed in housing 562 and is in fluid communication with second chamber 539 and with first port 553 of second pilot 560. Third port 577 is formed in housing 562 and is in fluid communication with fluid inlet 524 of pressure regulator 520 and with second diaphragm assembly 568. First diaphragm assembly 566 also includes a plug that moves with first diaphragm assembly 566 and second diaphragm assembly 568 in response to fluid pressure at the third port 577 between an open position, in which the plug is spaced apart from a seat and fluid is allowed to flow between first port 573 and second port 574, and a closed position, in which the plug sealingly engages the seat and fluid is prevented from flowing between first port 573 and second port 574.

Second pilot 560 is a standard spring to open pilot, such as a Tartarini® PRX/120. In the example shown in FIG. 6, second pilot 560 includes housing 542, which defines cavity 544. First and second diaphragm assemblies 546, 548 are disposed in cavity 544 to divide cavity 544 into first chamber 550, second chamber 552, and third chamber 556. Biasing member 551, such as a compression spring, is positioned in first chamber 550 to bias second pilot 560 into an open position. First port 553 is formed in housing 542 and is in fluid communication with second port 574 of first pilot 540 and with second chamber 539 of actuator assembly 530 of pressure regulator 520. Second port 554 is formed in housing 542 and is in fluid communication with fluid outlet 526 of fluid regulator 520. Third port 557 is formed in housing 542 and is in fluid communication with fluid inlet 524 of pressure regulator 520 and with second diaphragm assembly 548. Second diaphragm assembly 548 also includes a plug that moves with first diaphragm assembly 546 and second diaphragm assembly 548 in response to fluid pressure at third port 557 between an open position, in which the plug is spaced apart from a seat and fluid is allowed to flow between first port 553 and second port 554, and a closed position, in which the plug sealing engages the seat and fluid is prevented from flowing between first port 553 and second port 554.

In operation, first pilot 540 could be set to a first setpoint (e.g., 13 bar), which could be the pressure at which pressure regulator 520 would move from the normally closed to an open position. In addition, second pilot 560 could be set to a second setpoint (e.g., 11 bar), lower than the first setpoint, which could be the pressure at which pressure regulator 520 would reset and move from the open to the closed position. In this example, the dead band for control system 500 is set by setting the setpoint for first pilot 540 above the setpoint for second pilot 560.

During a first mode of operation, the pressure of the process fluid at fluid inlet 524 of pressure regulator 520 would be below both the first and second setpoints. When the fluid pressure at fluid inlet 524 is below both the first and second setpoints, first pilot 540 is in the closed position and second pilot 560 is in the open position. Therefore, the pressure in first chamber 538 and second chamber 539 of pressure regulator 520 are both equal to the fluid pressure at the fluid outlet 526, the forces from the fluid pressures acting on diaphragm assembly are equalized, biasing element 532 urges valve plug 528 into engagement with valve seat 525, and pressure regulator 520 remains in the closed position. In this first mode of operation, second chamber 539 of pressure regulator 520 is fluidly coupled to fluid outlet 526 through second pilot 560, which is open, and is isolated from fluid inlet 524 by first pilot 540, which is closed.

During a second mode of operation, the pressure of the process fluid at fluid inlet 524 increases and becomes greater than the second setpoint (but still less than the first setpoint) and second pilot 560 moves from the open position to the closed position, trapping the outlet pressure in second chamber 539 of pressure regulator 520, and first pilot 540 remains in the closed position. In the closed position, fluid pressure at third port 557 of second pilot 560 will move the plug into sealing engagement with the seat and prevent the flow of pressurized fluid from fluid outlet 526 into second chamber 539 of pressure regulator 20. In this second mode of operation, second chamber 539 of pressure regulator 520 is isolated from fluid outlet 526 by second pilot 560, which is closed, and is isolated from fluid inlet 524 by first pilot 540. Because the trapped pressure in second chamber 539 is equal to the pressure at the fluid outlet 526, pressure regulator 520 will remain in the closed position.

During a third mode of operation, the pressure of the process fluid at fluid inlet 524 continues to increase and becomes greater than the first setpoint (and still greater than the second setpoint) and first pilot 540 will move from a closed to an open position, fluidly connecting second chamber 539 of pressure regulator 520 to fluid inlet 524, and second pilot 560 remains in the closed position. In the open position, fluid pressure at third port 577 of first pilot 540 will move the plug away from the seat and allow the flow of fluid between first port 573, which is in fluid communication with fluid inlet 524, and second port 574, which is in fluid communication with second chamber 539 of pressure regulator 520. The increase in pressure in second chamber 539 will create an imbalance in the forces acting on diaphragm assembly 536, which moves valve plug 528 away from valve seat 525, placing pressure regulator 520 in the open position and allowing the flow of the process fluid through pressure regulator 520. In this third mode of operation, second chamber 539 of pressure regulator 520 is fluidly coupled to fluid inlet 524 through first pilot 540, which is open, and is isolated from fluid outlet 526 by second pilot 560, which is closed. Because first chamber 538 is open to fluid outlet 526 and second chamber 539 is open to fluid inlet 524 and the fluid pressures at fluid inlet 524 and fluid outlet 526 will fluctuate when pressure regulator 520 is in the open position in the third mode of operation, pressure regulator 520 can modulate in response to the fluid pressure at fluid outlet 526 with the fluid pressure at fluid inlet 524 greater than the first setpoint.

With pressure regulator 520 in the open position, the pressure at fluid inlet 524 will decrease. As the pressure of the process fluid at fluid inlet 524 decreases and drops below the first setpoint of first pilot 540 (but still above the second setpoint of second pilot 560), first pilot 540 will move from the open to the closed position, which prevents the flow of fluid from fluid inlet 524 to second chamber 539 of pressure regulator 520. At this point, the inlet pressure is trapped in second chamber 539 of pressure regulator 520, which remains in the open position.

As the pressure of the process fluid at fluid inlet 524 continues to decrease and drops below the second setpoint of second pilot 560, second pilot 560 will move from the closed to the open position, which will vent the inlet pressure from second chamber 539 of pressure regulator 520 to fluid outlet 526 and the pressure in second chamber 539 will again stabilize at the outlet pressure of fluid outlet 526. As the pressure in second chamber 539 decreases, diaphragm assembly 536 will move valve plug 528 toward valve seat 525 and to the closed position and automatically reset pressure regulator 520. As the fluid pressure forces acting on both sides of diaphragm assembly 536 rebalance, biasing element 532 will urge pressure regulator 520 into the closed position.

Figure 7:
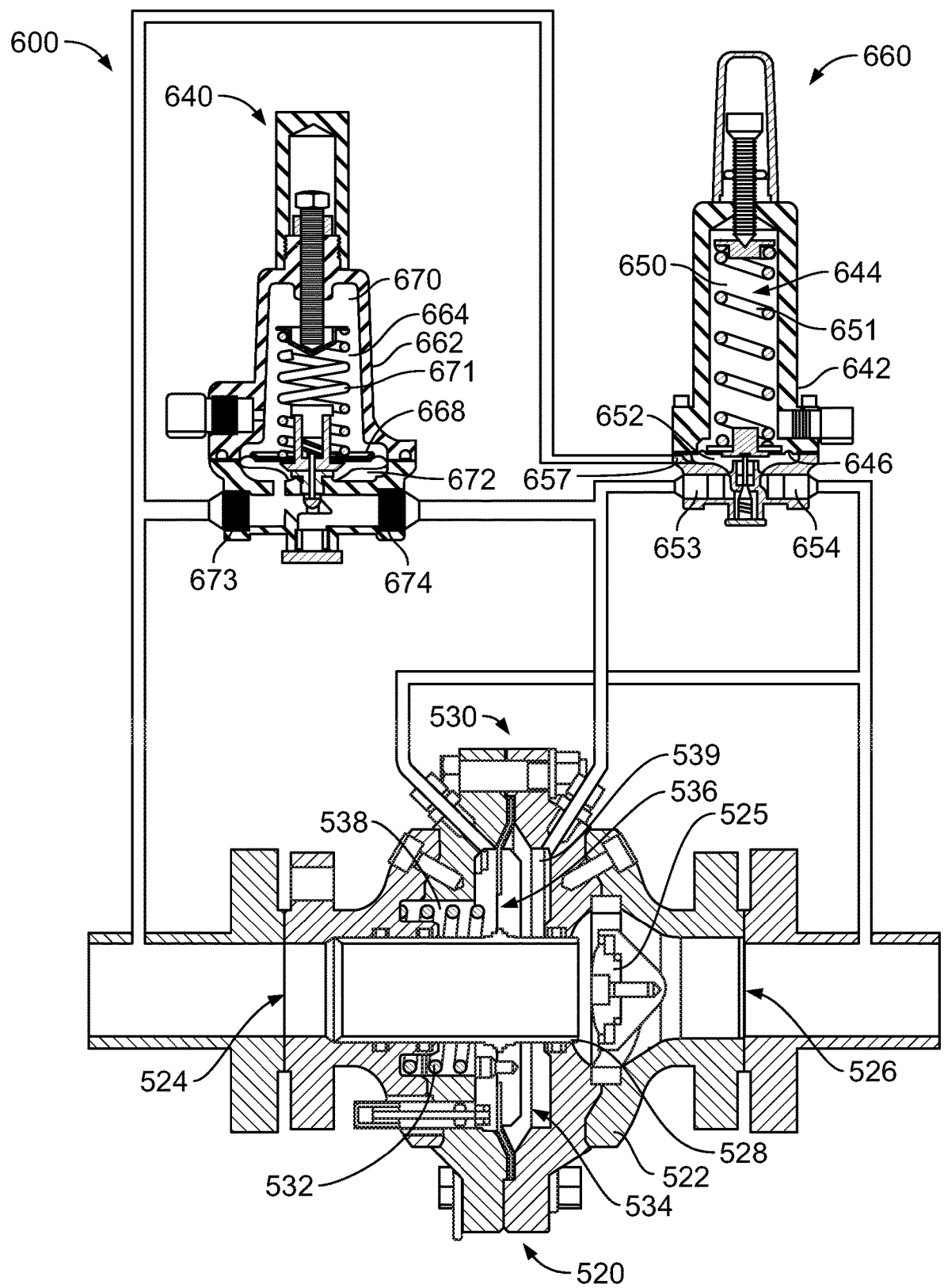
FIG. 7 is a schematic view of an alternative embodiment of the control system of FIG. 6.

FIG. 7 illustrates a control system 600, which is an alternate embodiment of the control system 500 of FIG. 6, using different types of pilots. Control system 600 also generally includes a pressure regulator 520, a first pilot 640 and a second pilot 660.

Pressure regulator 520 is a standard back-pressure regulator or relief valve, such as a Tartarini® Type FL Back-pressure Regulator, as described above.

First pilot 640 is a spring to close pilot, such as a Fisher® Type 6358 Series Pilot. In the example shown in FIG. 7, first pilot 640 includes housing 662, which defines cavity 664. Diaphragm assembly 668 is disposed in cavity 664 to divide cavity 664 into first chamber 670 and second chamber 672. Biasing member 671, such as a compression spring, is positioned in first chamber 670 to bias first pilot 640 into a closed position. First port 673 is formed in housing 662 and is in fluid communication with fluid inlet 524 of fluid regulator 520 and with second chamber 672 and diaphragm assembly 668. Second port 674 is formed in housing 662 and is in fluid communication with second chamber 539 and with first port 653 of second pilot 660. Diaphragm assembly 668 also includes a plug that moves with diaphragm assembly 668 in response to fluid pressure in second chamber 672 from first port 673 and is movable between an open position, in which the plug is spaced apart from a seat and fluid is allowed to flow between first port 673 and second port 674, and a closed position, in which the plug sealingly engages the seat and fluid is prevented from flowing between first port 673 and second port 674.

Second pilot 660 is a spring to open pilot, such as a Fisher® Type 161 Series Pilot. In the example shown in FIG. 7, second pilot 660 includes housing 642, which defines cavity 644. Diaphragm assembly 646 is disposed in cavity 644 to divide cavity 644 into first chamber 650 and second chamber 652. Biasing member 651, such as a compression spring, is positioned in first chamber 650 to bias second pilot 660 into an open position. First port 653 is formed in housing 642 and is in fluid communication with second port 674 of first pilot 640 and with second chamber 539 of pressure regulator 520. Second port 654 is formed in housing 642 and is in fluid communication with fluid outlet 526 of fluid regulator 520. Third port 657 is formed in housing 642 and is in fluid communication with fluid inlet 524 of pressure regulator 520 and with diaphragm assembly 646. Diaphragm assembly 646 also includes a plug that moves with second diaphragm assembly 646 in response to fluid pressure at third port 657 and is movable between an open position, in which the plug is spaced apart from a seat and fluid is allowed to flow between first port 653 and second port 654, and a closed position, in which the plug sealing engages the seat and fluid is prevented from flowing between first port 653 and second port 654.

In operation, first pilot 640 could be set to a first setpoint (e.g., 13 bar), which could be the pressure at which pressure regulator 520 would move from the normally closed to an open position. In addition, second pilot 660 could be set to a second setpoint (e.g., 11 bar), lower than the first setpoint, which could be the pressure at which pressure regulator 520 would reset and move from the open to the closed position. In this example, the dead band for control system 600 is set by setting the setpoint for first pilot 640 above the setpoint for second pilot 660.

During a first mode of operation, the pressure of the process fluid at fluid inlet 524 of pressure regulator 520 would be below both the first and second setpoints. When the fluid pressure at fluid inlet 524 is below both the first and second setpoints, first pilot 640 is in the closed position and second pilot 660 is in the open position. Therefore, the pressure in first chamber 538 and second chamber 539 of pressure regulator 520 are both equal to the fluid pressure at the fluid outlet 526, the forces from the fluid pressures acting on diaphragm assembly are equalized, biasing element 532 urges valve plug 528 into engagement with valve seat 525, and pressure regulator 520 remains in the closed position. In this first mode of operation, second chamber 539 of pressure regulator 520 is fluidly coupled to fluid outlet 526 through second pilot 660, which is open, and is isolated from fluid inlet 524 by first pilot 640, which is closed.

During a second mode of operation, the pressure of the process fluid at fluid inlet 524 increases and becomes greater than the second setpoint (but still less than the first setpoint) and second pilot 660 moves from the open position to the closed position, trapping the outlet pressure in second chamber 539 of pressure regulator 520. In the closed position, fluid pressure at third port 657 of second pilot 660 will move the plug into sealing engagement with the seat and prevent the flow of pressurized fluid from fluid outlet 526 into second chamber 539 of pressure regulator 20. In this second mode of operation, second chamber 539 of pressure regulator 520 is isolated from fluid outlet 526 by second pilot 660, which is closed, and is isolated from fluid inlet 524 by first pilot 640. Because the trapped pressure in second chamber 539 is equal to the pressure at fluid outlet 526, pressure regulator 520 will remain in the closed position.

During a third mode of operation, the pressure of the process fluid at fluid inlet 524 continues to increase and becomes greater than the first setpoint and first pilot 640 will move from a closed to an open position, fluidly connecting second chamber 539 of pressure regulator 520 to fluid inlet 524. In the open position, fluid pressure in second chamber 672 from first port 673 of first pilot 640 will move the plug away from the seat and allow the flow of fluid between first port 673, which is in fluid communication with fluid inlet 524, and second port 674, which is in fluid communication with second chamber 539 of pressure regulator 520. The increase in pressure in second chamber 539 will create an imbalance in the forces acting on diaphragm assembly 536, which moves valve plug 528 away from valve seat 525, placing pressure regulator 520 in the open position and allowing the flow of the process fluid through pressure regulator 520. In this third mode of operation, second chamber 539 of pressure regulator 520 is fluidly coupled to fluid inlet 524 through first pilot 640, which is open, and is isolated from fluid outlet 526 by second pilot 660, which is closed.

With pressure regulator 520 in the open position, the pressure at fluid inlet 524 will decrease. As the pressure of the process fluid at fluid inlet 524 decreases and drops below the first setpoint of first pilot 640 (but still above the second setpoint of second pilot 660), first pilot 640 will move from the open to the closed position, which prevents the flow of fluid from fluid inlet 524 to second chamber 539 of pressure regulator 520. At this point, the inlet pressure is trapped in second chamber 539 of pressure regulator 520, which remains in the open position.

As the pressure of the process fluid at fluid inlet 524 continues to decrease and drops below the second setpoint of second pilot 660, second pilot 660 will move from the closed to the open position, which will vent the inlet pressure from second chamber 539 of pressure regulator 520 to fluid outlet 526 and the pressure in second chamber 539 will again stabilize at the outlet pressure of fluid outlet 526. As the pressure in second chamber 539 decreases, diaphragm assembly 536 will move valve plug 528 toward valve seat 525 and to the closed position and automatically reset pressure regulator 520. As the fluid pressure forces acting on both sides of diaphragm assembly 536 rebalance, biasing element 532 will urge pressure regulator 520 into the closed position.

Figure 8:
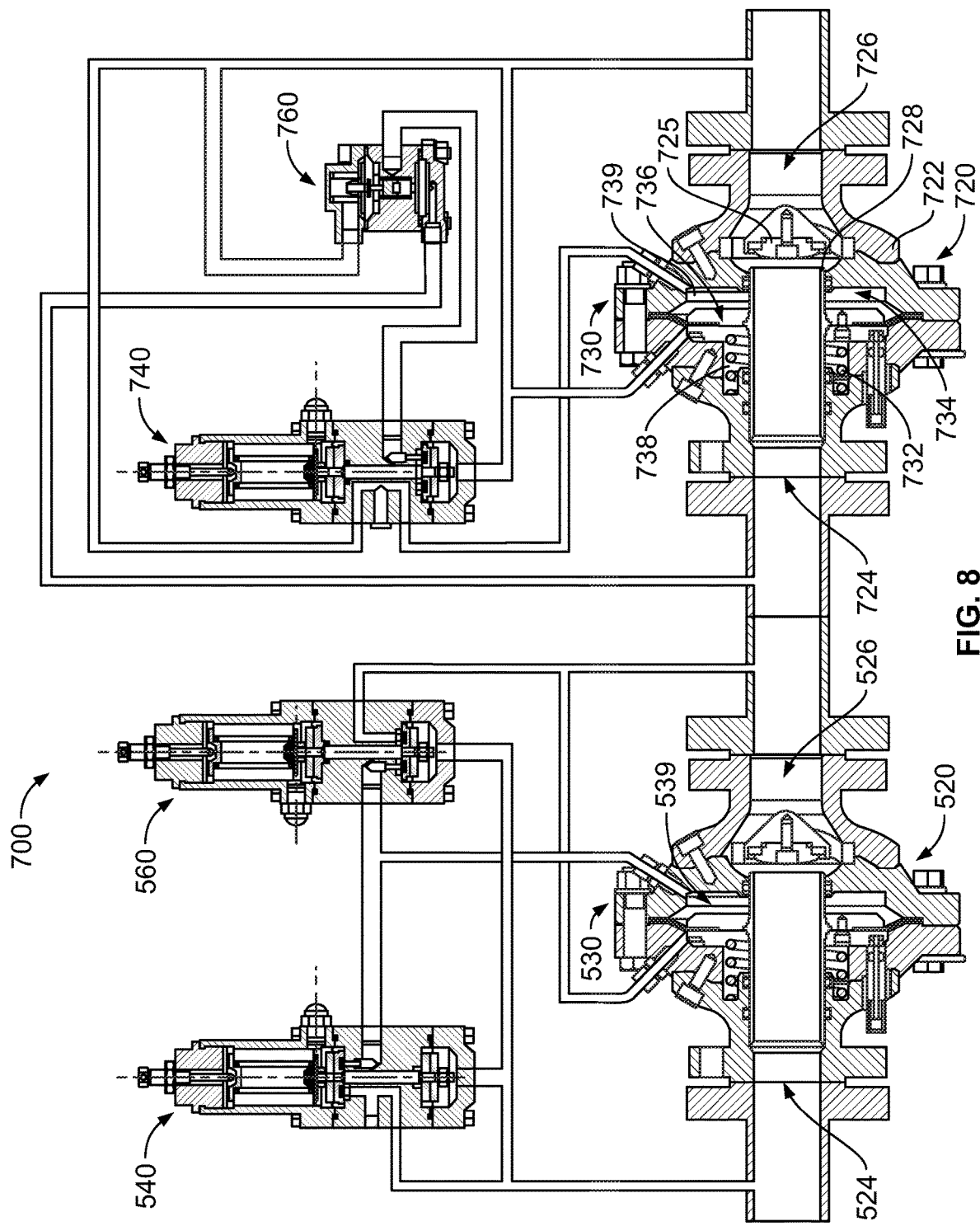
FIG. 8 is a schematic view of another example control system having an adjustable deadband for back pressure regulators or relief valves incorporating the control system of FIG. 6.

FIG. 8 illustrates a control system 700 that includes pressure regulator 520, first pilot 540, and second pilot 560, as described for control system 500 above. In control system 700, pressure regulator 520, first pilot 540, and second pilot 560 are arranged the same and operate the same as discussed above for control system 500. In addition, control system 700 also includes a downstream fluid control device. In the illustrated embodiment, the downstream fluid control device is second pressure regulator 720, which is configured to control a fluid pressure downstream of second pressure regulator 720. In other embodiments, the downstream fluid control device may be a control valve, a relief valve, a back-pressure regulator, or any other fluid control device.

Second pressure regulator 720 is a pressure-reducing regulator, such as a Tartarini® Type FL Regulator. In the example shown in FIG. 8, second pressure regulator 720 has a body 722 and an actuator assembly 730. Body 722 defines fluid inlet 724 in fluid communication with fluid outlet 526 of pressure regulator 520, fluid outlet 726, and valve seat 725 between fluid inlet 724 and fluid outlet 726. Valve plug 728 is movable within body 722 between an open position, where valve plug 728 is spaced from valve seat 725 and a process fluid is allowed to flow through second pressure regulator 720 from fluid inlet 724 to fluid outlet 726, and a closed position, where valve plug 728 sealing engages valve seat 725 and the process fluid is prevented from flowing through second pressure regulator 720. Actuator assembly 730 defines cavity 734 and diaphragm assembly 736 is disposed within cavity 734 to divide cavity 734 into first chamber 738, which is in fluid communication with fluid outlet 726, and second chamber 739, which is in fluid communication with third pilot 740. Diaphragm assembly 736 is operatively connected to valve plug 728 such that valve plug 728 moves with diaphragm assembly 736 to move valve plug 728 into and out of sealing engagement with valve seat 725. Biasing member 732, such as a compression spring, is disposed in first chamber 738 to bias valve plug 728 of pressure regulator 720 toward the closed position.

Third pilot 740 is a standard spring to open pilot, such as a Fisher® Type PRX Pilot that is configured to supply a loading pressure, such as the fluid pressure from fluid inlet 724 and/or from an output of pressure stabilizer 760, to second chamber 739 of second pressure regulator 720 in response to the fluid pressure at fluid outlet 726 of second pressure regulator 720.

Pressure stabilizer 760 is a standard pressure stabilizer, such as a Tartarini® Type SA/2 Pressure Stabilizer. Pressure stabilizer 760 receives a fluid pressure from fluid inlet 724 of second pressure regulator 720 and regulates the flow of fluid from fluid inlet 726 to third pilot 740 based on the fluid pressure at fluid outlet 726.

With first pilot 540 having a setpoint of 13 bar and second pilot 560 having a setpoint of 11 bar, as discussed in detail above, control system 700 will operate as follows:

| Inlet Pressure at Fluid Inlet 524 (bar) | Intermediate Pressure at Fluid Outlet 526 and Fluid Inlet 724 (bar) | Loading Pressure at Second Chamber 539 (bar) | Outlet Pressure at Fluid Outlet 726 (bar) | Position of Pressure Regulator 520 |
|---|---|---|---|---|
| 10 | 4 | 4 | 4 | Close |
| 11 | 4 | 4 | 4 | Close |
| 12 | 4 | 4 | 4 | Close |
| 13 | 13 | 13 | 4 | Open/Close* |
| 14 | 14 | 14 | 4 | Open/Close* |
| 13 | 13 | 13 | 4 | Open/Close* |
| 12 | 12 | 13 | 4 | Open |
| 11 | 4 | 4 | 4 | Close |
| 10 | 4 | 4 | 4 | Close |

*The unit will open based on demand. As the intermediate pressure decreases due to demand increase the unit opens.

Figure 9:
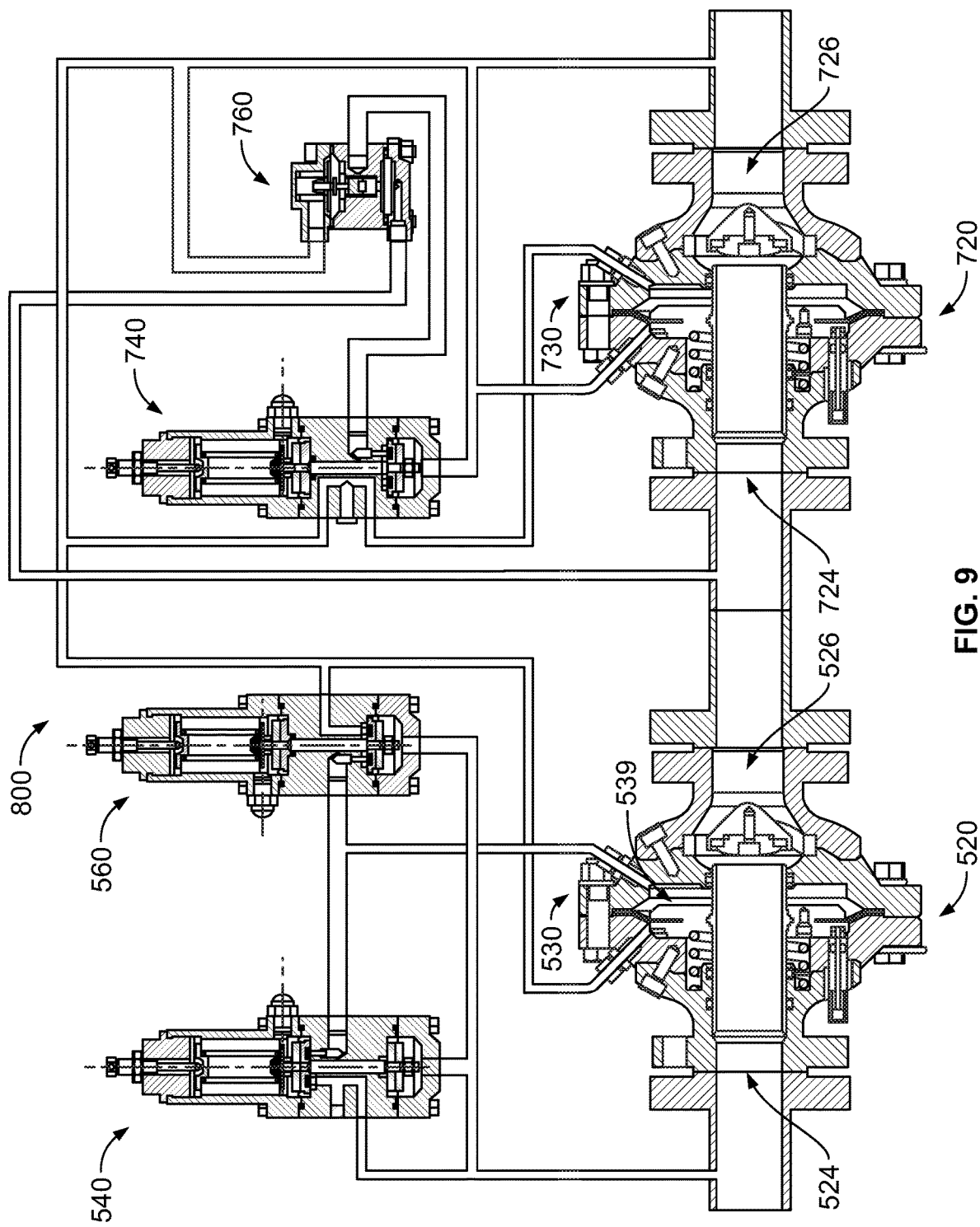
FIG. 9 is a schematic view of an alternative embodiment of the control system of FIG. 8.

FIG. 9 illustrates a control system 800 that is identical to control system 700, except that first chamber 528 of pressure regulator 520 and second port 554 of second pilot 560 are in fluid communication with fluid outlet 726 of the downstream fluid control device (again the second pressure regulator 720 in the illustrated embodiment), rather than with fluid outlet 526 of pressure regulator 520.

With first pilot 540 having a setpoint of 13 bar and second pilot 560 having a setpoint of 11 bar, as discussed in detail above, control system 800 will operate as follows:

| Inlet Pressure at Fluid Inlet 524 (bar) | Intermediate Pressure at Fluid Outlet 526 and Fluid Inlet 724 (bar) | Loading Pressure at Second Chamber 539 (bar) | Outlet Pressure at Fluid Outlet 726 (bar) | Position of Pressure Regulator 520 |
|---|---|---|---|---|
| 10 | 4 | 4 | 4 | Close |
| 11 | 4 | 4 | 4 | Close |
| 12 | 4 | 4 | 4 | Close |
| 13 | 13 | 13 | 4 | Open |
| 14 | 14 | 14 | 4 | Open |
| 13 | 13 | 13 | 4 | Open |
| 12 | 12 | 13 | 4 | Open |
| 11 | 4 | 4 | 4 | Close |
| 10 | 4 | 4 | 4 | Close |

The difference between control system 700 and control system 800 is how pressure regulator 520 behaves when first pilot 540 is open. In control system 700, pressure regulator 520 will open when pressure decreases due to demand when first pilot 540 is open. In control system 800, pressure regulator 520 will always be open when first pilot 540 is open.

Control system 700 can be used for safety purposes. In the event one of the seats of first pilot 540 or second pilot 560 do not lock up, pressure will leak by. If the first and second pilots 540, 560 are registering and bleeding to downstream pressure, then the pressure will bleed downstream, which can bypass all over pressure protection methods.

While various embodiments have been described above, this disclosure is not intended to be limited thereto. Variations can be made to the disclosed embodiments that are still within the scope of the appended claims.

What is claimed is:
1. A control system, comprising:
a pressure regulator comprising a fluid inlet, a fluid outlet, and an actuator assembly, the actuator assembly comprising a cavity and a diaphragm assembly disposed within the cavity and dividing the cavity into a first chamber and a second chamber, the first chamber in fluid communication with the fluid outlet;
a first pilot in direct fluid communication with the second chamber of the actuator assembly and the fluid inlet, the first pilot having a first setpoint; and
a second pilot in direct fluid communication with the second chamber of the actuator assembly, the fluid inlet, and the fluid outlet, the second pilot having a second setpoint that is less than the first setpoint; wherein
the first pilot and the second pilot are configured to:
fluidly couple the second chamber to the fluid outlet and isolate the second chamber from the fluid inlet with the control system in a first mode of operation;
isolate the second chamber from the fluid outlet and the fluid inlet with the control system in a second mode of operation; and fluidly couple the second chamber to the fluid inlet with the control system in a third mode of operation.

2. The control system of claim 1, wherein:
the first pilot is configured to be in a closed position and the second pilot is configured to be in an open position with the control system in the first mode of operation;
the first pilot is configured to be in the closed position and the second pilot is configured to be in a closed position with the control system in the second mode of operation; and
the first pilot is configured to be in an open position and the second pilot is configured to be in the closed position with the control system in the third mode of operation.

3. The control system of claim 1, wherein:
the control system is configured to operate in the first mode of operation with a fluid pressure at the fluid inlet below the first setpoint and below the second setpoint;
the control system is configured to operate in the second mode of operation with the fluid pressure at the fluid inlet above the second setpoint and below the first setpoint; and
the control system is configured to operate in the third mode of operation with the fluid pressure at the fluid inlet above the first setpoint and above the second setpoint.

4. The control system of claim 1, wherein the pressure regulator is configured to be closed when a fluid pressure at the fluid inlet transitions from a value below the second setpoint to a value between the first setpoint and the second setpoint and configured to be open when the fluid pressure at the fluid inlet transitions from a value above the first setpoint to a value between the first setpoint and the second setpoint.

5. The control system of claim 4, where the pressure regulator is configured to modulate in response to a fluid pressure at the fluid outlet with the fluid pressure at the fluid inlet greater than the first setpoint.

6. The control system of claim 1, wherein:
the pressure regulator is configured to be in a closed position with a fluid pressure at the fluid inlet below the second setpoint; and
the pressure regulator is configured to be in an open position with the fluid pressure at the fluid inlet above the first setpoint.

7. The control system of claim 1, wherein the pressure regulator is a back-pressure regulator.

8. The control system of claim 7, wherein the pressure regulator comprises a spring disposed in the first chamber to urge the pressure regulator towards the closed position.

9. The control system of claim 1, further comprising a downstream fluid control device in fluid communication with the fluid outlet of the pressure regulator.

10. The control system of claim 9, wherein the downstream fluid control device is a second pressure regulator that is configured to control a fluid pressure downstream of the second pressure regulator.

11. A control system, comprising:
a pressure regulator comprising a fluid inlet, a fluid outlet, and an actuator assembly, the actuator assembly comprising a cavity and a diaphragm assembly disposed within the cavity and dividing the cavity into a first chamber and a second chamber, the first chamber in fluid communication with the fluid outlet;
a first pilot in fluid communication with the second chamber of the actuator assembly and the fluid inlet, the first pilot having a first setpoint and; and
a second pilot in fluid communication with the second chamber of the actuator assembly, the fluid inlet, and the fluid outlet, the second pilot having a second setpoint that is less than the first setpoint; wherein
the first pilot comprises a first port in fluid communication with the fluid inlet of the pressure regulator, a second port in fluid communication with the second pilot and the second chamber of the pressure regulator, and a third port in fluid communication with the fluid inlet of the pressure regulator and with a diaphragm assembly of the first pilot; and
the first pilot and the second pilot are configured to:
fluidly couple the second chamber to the fluid outlet and isolate the second chamber from the fluid inlet with the control system in a first mode of operation;
isolate the second chamber from the fluid outlet and the fluid inlet with the control system in a second mode of operation; and
fluidly couple the second chamber to the fluid inlet with the control system in a third mode of operation.

12. The control system of claim 11, wherein the first pilot comprises a spring to urge the first pilot toward the closed position.

13. The control system of claim 11, wherein the second pilot comprises a first port in fluid communication with the second port of the first pilot and the second chamber of the pressure regulator, a second port in fluid communication with the fluid outlet of the pressure regulator, and a third port in fluid communication with the fluid inlet of the pressure regulator and with a diaphragm assembly of the second pilot.

14. The control system of claim 13, wherein the second pilot comprises a spring to urge the second pilot toward the open position.

* * * * *